(12) United States Patent
Sato

(10) Patent No.: US 6,671,129 B2
(45) Date of Patent: Dec. 30, 2003

(54) CONTACT TYPE MAGNETIC DISC APPARATUS

(75) Inventor: Akinobu Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/100,074

(22) Filed: Mar. 19, 2002

(65) Prior Publication Data

US 2002/0181154 A1 Dec. 5, 2002

Related U.S. Application Data

(62) Division of application No. 09/328,449, filed on Jun. 9, 1999, now Pat. No. 6,385,013.

(30) Foreign Application Priority Data

Jun. 9, 1998 (JP) .............................. 10-160046

(51) Int. Cl.[7] .......................... G11B 5/60; G11B 5/187; G11B 5/72; G11B 21/21
(52) U.S. Cl. .............................. 360/237.1; 360/235.2; 360/135
(58) Field of Search ....................... 360/237.1, 235.2, 360/236.6, 122, 135

(56) References Cited

U.S. PATENT DOCUMENTS

| | | | |
|---|---|---|---|
| 4,639,803 A | | 1/1987 | Takeda et al. |
| 4,819,091 A | | 4/1989 | Brezoczky et al. |
| 5,198,934 A | | 3/1993 | Kubo et al. |
| 5,835,305 A | | 11/1998 | Hamaguchi et al. |
| 5,949,612 A | | 9/1999 | Gudeman et al. |
| 6,040,958 A | | 3/2000 | Yamamoto et al. |
| 6,385,013 B1 | * | 5/2002 | Sato ........................ 360/235.2 |

FOREIGN PATENT DOCUMENTS

| | | | |
|---|---|---|---|
| JP | 1-258218 | | 10/1989 |
| JP | 1-258219 A | * | 10/1989 |
| JP | 2-249177 | | 10/1990 |
| JP | 4-113568 | | 4/1992 |
| JP | 4-182916 | | 6/1992 |
| JP | 4-364217 | | 12/1992 |
| JP | 5-046964 | | 2/1993 |
| JP | 5-151735 | | 6/1993 |
| JP | 9-204626 | | 8/1997 |
| JP | 9-245331 | | 9/1997 |
| JP | 9-245332 | | 9/1997 |
| JP | 9-282606 | | 10/1997 |
| JP | 9-282607 | | 10/1997 |
| JP | 11-306539 | * | 11/1999 |
| WO | WO93/14495 | | 7/1993 |

OTHER PUBLICATIONS

Machine-translated copy of JP 09-204626.*
Hamilton, H., "Contact Recording on Perpendicular Rigid Media", Journal of the Magnetics Society of Japan, vol. 15, supplement No. S2 (1991), pp. 483-490.

* cited by examiner

*Primary Examiner*—William Klimowicz
(74) *Attorney, Agent, or Firm*—McGinn & Gibb, PLLC

(57) ABSTRACT

The density of the magnetic head protective layer is set to be higher than the density of a magnetic disc medium protective layer. Also, the Young's modulus of the magnetic head protective layer is set to be higher than the Young's modulus of the magnetic disc medium protective layer. Furthermore, the thickness of the magnetic disc medium protective layer is set to be between 1 and 10 nm, and the hardness of the magnetic head protective layer is set to be between 1.5 and 2.0 times the hardness of the magnetic disc medium protective layer. It is thus possible to provide a highly reliable magnetic disc apparatus.

9 Claims, 1 Drawing Sheet

CONTACT TYPE MAGNETIC DISC APPARATUS

The present application is a Divisional application of U.S. patent application Ser. No. 09/328,449, filed on Jun. 9, 1999, now U.S. Pat. Ser. No. 6,385,013.

BACKGROUND OF THE INVENTION

The present invention relates to contact type magnetic disc apparatuses and, more particularly, to contact type magnetic disc apparatuses, in which a magnetic head is driven on frictional contact with a magnetic disc medium for recording and reproduction.

Recently, in data storage file fields, the recording density is being steadily improved. For increasing the recording density of the magnetic disc apparatus, it is thus one of the most important factors to reduce the gap between a magnetic head for writing and reading data and a magnetic disc medium storing the data. For reducing the gap between the magnetic head and the magnetic disc medium, a so-called contact type magnetic disc apparatus, in which the magnetic head is driven in frictional contact with the magnetic disc medium surface for recording and reproduction, has been developed (See, for instance H. Hamilton, Journal of Magnetic Society of Japan, Vol. 15, Supplement No. S2 (1991) 483, and also Japanese Patent Application No. 5-508808 (Japanese Patent Publication Disclosure No. 5-814495). In such contact type magnetic disc apparatuses, it is important to prevent wear and damages of the magnetic disc medium and the magnetic head.

Various techniques have been developed for the purpose of reducing the wear and damages in the contact type magnetic disc apparatus. For instance, Japanese Patent Laid-Open No. 2-249177 discloses a technique for preventing the wear of the magnetic disc medium and the magnetic head in such a manner that surplus liquid lubricant is always supplied to the magnetic disc medium surface by circulating the lubricant in the magnetic disc apparatus. Also, Japanese Patent Laid-Open No. 4-113568 discloses a technique, in which non-newton liquid lubricant is provided between the magnetic head and the magnetic disc medium in the same structure as above. Furthermore, Japanese Patent Laid-Open No. 5-1511735 discloses a slider structure which is suited for sliding over lubricant on the magnetic disc medium surface.

In the meantime, recent high recording density magnetic disc apparatuses mostly employ a separate recording and recording element type magnetic head, which uses an MR reproducing element utilizing magnetoresitive (MR) effect for reproducing data (hereinunder referred to as MR head). The MR head usually has a protective layer formed on the slider surface for the purposes of preventing the electric discharge of the element and improving the corrosion resistance thereof, as disclosed in, for instance, Japanese Patent Disclosure No. 4-364217. The wear of the protective layer of the head leads to deterioration of the MR head characteristics, and in the magnetic disc apparatus employing the MR element it is thus particularly important to suppress wear and damages of the head side protective layer. To this end, Japanese Patent Laid-Open No. 9-204626 discloses a magnetic disc apparatus having a protective layer on the sliding surface of the magnetic head, in which the hardness of the protective layer is set to be higher than two times, Preferably three times, the hardness of a protective layer of the magnetic disc medium for preventing wear and damages of both the magnetic disc medium protective layer and the magnetic head protective layer.

The prior art magnetic disc apparatuses as shown above, however, have the following problems.

The magnetic disc apparatuses using liquid lubricant, as disclosed in the Japanese Patent Laid-Open No. 2-249177, 4-113568 and 5-151735, it is sought to suppress wear by always supplying surplus lubricant to the frictional surfaces of the magnetic head and the magnetic disc medium. However, the actual magnetic disc apparatus has a problem that it is extremely difficult to steadily supply clean lubricant at a constant rate so that it is difficult to ensure stable operation of the apparatus for long time.

The technique of providing protective layers on the sliding surface of the magnetic head and providing a protective layer on the magnetic disc medium as disclosed in the Japanese Patent Disclosure No. 9-204626, is effective so long as the magnetic disc medium protective layer has as large thickness as 15 nm or above. However, where the thickness of the protective layer is reduced to 10 nm or below, the magnetic disc medium protective layer may be worn and damaged, resulting in wear of the magnetic head protective layer. Particularly, since it is nowadays important to reduce the magnetic spacing to cope with a recent increasing recording density trend, it is important to reduce the thickness of the protective layer and layer.

SUMMARY OF THE INVENTION

In view of the above prior art, an object of the present invention concerns a magnetic disc medium, which permits recording and reproduction in a state that it can be in intermittent or continuous contact with a magnetic head, and it is sought to prevent wear and damages of a magnetic head protective layer and a magnetic disc protective layer in contact with each other, particularly it is sought to provide a magnetic disc apparatus, which is less subject to wear or damages even when the thicknesses of the magnetic head protective layer and the magnetic disc medium protective layer are reduced, as well as having high recording density and being excellently reliable.

According to an aspect of the present invention, there is provided a magnetic disc apparatus comprising a magnetic disc medium having a protective layer on the surface, a means for rotating the magnetic disc medium, a magnetic head for recording and reproducing data on and from the magnetic disc medium, and a control means for controlling the magnetic disc medium, the rotating means and the head, the head being rotated intermittently or continuously in frictional contact with the magnetic disc medium, wherein the head has a protective layer formed on at least part of a portion to be in frictional contact with the magnetic disc medium, the magnetic head protective layer having a density higher than the density of the magnetic disc medium protective layer.

With these settings, wear and damages due to the sliding are not caused partially on either the magnetic disc medium protective layer side or the magnetic head protective layer side, but they can proceed uniformly on both sides. Consequently, the degree of wear and damages can be extremely reduced. It is thus possible to provide a highly reliable magnetic disc apparatus, which is subject to less wear and damages and excellently reliable.

According to another aspect of the present invention, there is provided a magnetic disc apparatus comprising a magnetic disc medium having a protective layer on the surface, a means for rotating the magnetic disc medium, a magnetic head for recording and reproducing data on and from the magnetic disc medium, and a control means for controlling the magnetic disc medium, the rotating means and the head, the head being rotated intermittently or continuously in frictional contact with the magnetic disc medium, wherein the magnetic head protective layer has a Young's modulus higher than the Young's modulus of the magnetic disc medium protective layer.

According to other aspect of the present invention, there is provided a magnetic disc apparatus comprising a magnetic disc medium having a protective layer of thickness between 1 and 10 nm on the surface, a means for rotating the magnetic disc medium, a magnetic head for recording and reproducing data on and from the magnetic disc medium, and a control means for controlling the magnetic disc medium, the rotating means and the head, wherein the head has a protective layer formed on at least part of a portion to be in frictional contact with the magnetic disc medium, the magnetic head protective layer of a hardness between 1.5 and 2.0 times the hardness of the magnetic disc medium protective layer.

The magnetic head protective layer and the magnetic disc medium protective layer are made of the same material. The magnetic head protective layer and the magnetic disc medium protective layer are made of material including mainly carbon.

According to still other aspect of the present invention, there is provided a magnetic disc apparatus comprising a magnetic disc medium having a protective layer on its surface, and a magnetic head for recording and reproducing data on and from the magnetic disc medium having a protective layer on its surface, the magnetic disc medium and the magnetic head being rotated in frictional contact therebetween, wherein the magnetic head protective layer having a density higher than the density of the magnetic disc medium protective layer.

According to further aspect of the present invention, there is provided a magnetic disc apparatus comprising a magnetic disc medium having a protective layer on its surface, and a magnetic head for recording and reproducing data on and from the magnetic disc medium having a protective layer on its surface, the magnetic disc medium and the magnetic head being rotated in frictional contact therebetween, wherein the magnetic head protective layer has a Young's modulus higher than the Young's modulus of the magnetic disc medium protective layer.

According to still further aspect of the present invention, there is provided a magnetic disc apparatus comprising a magnetic disc medium having a protective layer on its surface, and a magnetic head for recording and reproducing data on and from the magnetic disc medium having a protective layer on its surface, the magnetic disc medium and the magnetic head being rotated in frictional contact therebetween, wherein the magnetic head protective layer of a hardness between 1.5 and 2.0 times the hardness of the magnetic disc medium protective layer.

The densities of the magnetic disc medium protective layer and the magnetic bead protective layer are set to be in ranges of 1.2 to 1.8 (g/cm$^3$) and 1.0 to 2.0 (g/cm$^3$), respectively. The Young's moduluses of the magnetic disc medium protective layer and the magnetic head protective layer are set to be in ranges of 200 to 400 (GPa) and 250 to 500 (GPa), respectively. The thickness of the magnetic disc medium protective layer is set to be between 1 and 10 nm, and the hardness of the magnetic head protective layer is set to be between 1.5 and 2.0 times the hardness of the magnetic disc medium protective layer. The thickness of the magnetic disc medium protective layer is 15 nm or above, and the hardness of the magnetic head protective layer is higher than 2.0 times the hardness of the magnetic disc medium protective layer. The magnetic head protective layer and the magnetic disc medium protective layer are formed as a carbon layer with or without a hydrogen or nitrogen content. The magnetic head protective layer and the magnetic disc medium protective layer are formed as SiC, SiN or BN.

Other objects and features will be clarified from the following description with reference to attached drawings.

PREFERRED EMBODIMENTS OF THE INVENTION

Figure 1:
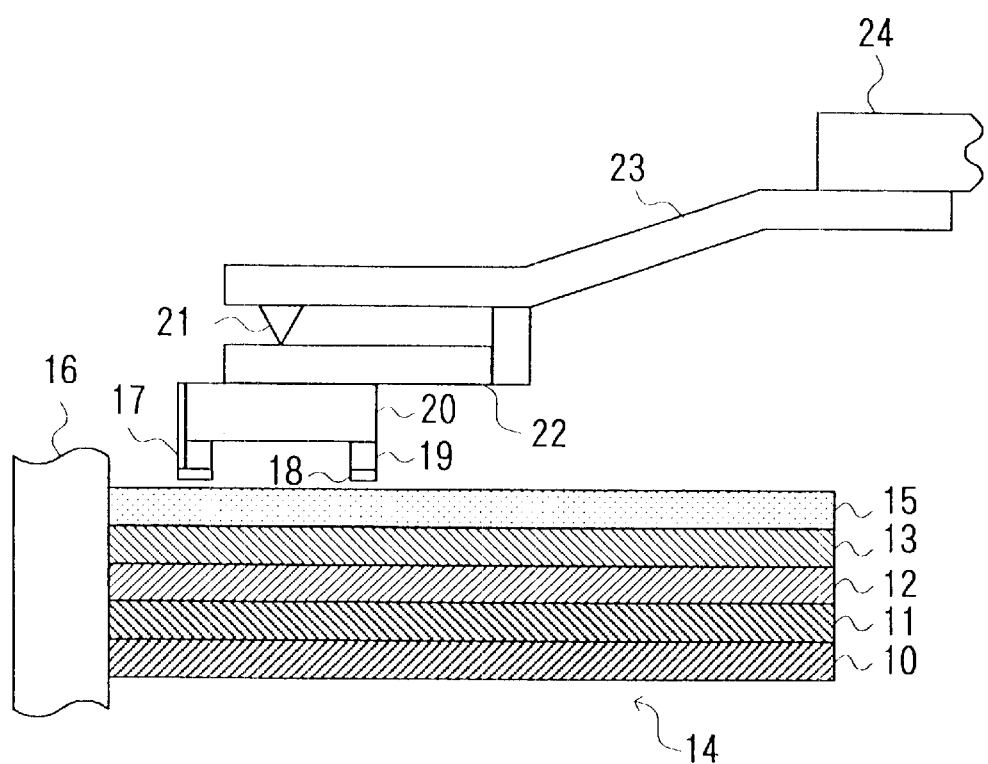
FIG. 1 is a sectional view showing the basic structure of the magnetic disc apparatus according to the present invention.

Preferred embodiments of the present invention will now be described with reference to the drawings.

FIG. 1 is a sectional view showing the basic structure of the magnetic disc apparatus according to the present invention. Reference numeral 14 designates a magnetic disc medium, which is a laminate having a substrate 10, a base layer 11, a magnetic layer 12, a magnetic disc medium protective layer 13 and a lubricant layer 15, these layers being laminated in the mentioned order. The medium 14 is mounted on and rotated by a spindle motor 16. A magnetic head, on the other hand, has a magnetic head slider 20 a magnetic recording/reproducing element 17, a contact pad 19 and a magnetic head protective layer 18, and it is supported by a support arm 24 via a gimbal spring 22 and a load beam spring 23.

Using a magnetic disc apparatus having the construction as described above, relations of the physical properties and the mechanical durability of the magnetic disc protective layer and the magnetic head protective layer to one another were investigated. As a specific example, the investigations were conducted as follows.

Of the magnetic disc medium 14 in the embodiment shown in FIG. 1, as the substrate 10 was used a glass substrate having a diameter of 63.5 mm and a thickness of 0.3 mm. On this glass substrate, the base layer 11 and the magnetic layer 12 were formed by sputtering Cr and CoCr-TaPt to thicknesses of 100 nm and 30 nm, respectively. Then the magnetic disc medium protective layer 13 was formed as a carbon layer with or without a hydrogen or nitrogen content either by a plasma chemical vapor deposition (CVD) method or a sputtering method. Finally, the lubricant layer 15 was formed from perfluoropolyether to a thickness of 5 nm by a dipping method.

The magnetic head slider 20 was formed from Al$_2$O$_3$—TiC such as to have a width of 1 mm, a length of 1.2 mm and a thickness of 0.3 mm. The contact pad 19 was formed such as to have a diameter of 30 μm and a height of 6 μm by milling the magnetic head slider 20 with argon ions.

As the magnetic recording/reproducing element 17 an MR reproducing element of NiMn was used. The magnetic head protective film 18 was formed on the magnetic recording/reproducing element 17 and the contact pad 19 on the side of these parts facing the magnetic disc medium 14. The magnetic head protective layer 18 was formed by sputtering silicon to form a close contact layer 1 nm in thickness and then forming a carbon layer with or without a hydrogen or nitrogen content by the plasma CVD method or the sputtering method. The thickness of the magnetic head protective layer 18 was varied in a range of 2 to 20 nm as total thickness of the silicon and carbon layers.

The gimbal spring 22, the load beam spring 23 and the support arm 24 supporting the magnetic head slider 20 were all formed from stainless steel. The gimbal spring 22 was formed to have a length of 2 mm, a width of 1 mm and a thickness of 0.01 mm. The load beam spring 23 was formed to have a length of 10 mm, a width of 1.2 mm and a thickness of 0.05 mm. The support arm 24 was formed to have a length of 15 mm, a width of 3 mm and a thickness of 1 mm. A pivot 21 was formed by compressing the load beam spring 23 such as to be a spherical projection having a diameter of 0.2 mm and a height of 0.1 m.

The physical properties of the magnetic head protective layer and the magnetic disc medium protective layer were controlled by varying the kind and flow rate of the CVD gas and sputtering gas and also the input power level and the bias voltage level when forming the layer and the layer. Protective layers and layers having predetermined densities, Young's moduluses and hardnesses were thus formed, thus producing Examples No. 1 to 4 of magnetic disc apparatus. Contrast Examples No. 1 to 87 were also formed for comparison with the examples.

Durability tests were then conducted on the magnetic disc apparatuses thus produced. In the tests, the magnetic disc medium was held rotating at 5,400 r.p.m. in frictional contact with the magnetic head slider at a radial position of 30 mm for 1,000 hours, and then the wear heights of the magnetic head protective layer and the magnetic disc protective layer were measured by using an inter-atomic power microscope and an ellipsometer.

Tables 1 to 4 show the wear heights of the magnetic disc medium protective layers and an the magnetic head protective layers obtained as the results of the durability tests conducted by using magnetic disc apparartuses, which were producing by setting the densities of the magnetic disc medium protective layer and the magnetic head protective layer in ranges of 1.2 to 1.8 (g/cm$^3$) and 1.0 to 2.0 (g/cm$^3$), respectively. The thicknesses of the magnetic disc medium protective layer and the magnetic head protective layer were both set to 10 nm.

With reference to the results of tests on Examples No. 1 to 20 and Contrast Examples No. 1 to 24 in Tables 1 to 4, it will be seen that the wear heights of the magnetic disc medium protective layer and the magnetic head protective layer can both be held to be small when the density of the magnetic head protective layer is higher than that of the magnetic disc medium protective layer. It will also be seen that when the density of the magnetic head protective layer is equal to or lower than the density of the magnetic disc medium protective layer, the wear height of the magnetic head protective layer is extremely large, although the wear height of the magnetic disc medium protective layer can be held to be small. It can thus be concluded that by setting the density of the magnetic head protective layer to be higher than the density of the magnetic disc medium protective layer, it is possible to extremely reduce the wear of both the magnetic disc medium protective layer and the magnetic head protective layer and provide a magnetic disc apparatus which is less subject to wear and damages, excellently durable and highly reliable.

Tables 5 and 6 show the results of durability tests, i.e., wear heights of magnetic disc medium protective layers and magnetic heads protective layers, obtained with magnetic disc apparatuses, which were produced by setting the Young's moduluses of the magnetic disc medium protective layer and the magnetic head protective layer in ranges of 200 to 400 (GPa) and 150 to 500 (GPa), respectively. The thicknesses of the magnetic disc medium protective layer and the magnetic head protective layer were both set to 10 nm.

With reference to the results of tests on Examples No. 21 to 32 and Contrast Examples No. 25 to 36 in Tables 5 and 6, it will be seen that the wear heights of the magnetic disc medium protective layer and the magnetic head protective layer can both be held to be small when the Young's modulus of the magnetic head protective layer is higher than the Young's modulus of the magnetic disc medium protective layer. It will also be seen that when the Young's modulus of the magnetic head protective layer is equal to or lower than the Young's modulus of the magnetic disc medium protective layer, the wear height of the magnetic head protective layer is extremely large although the wear height of the magnetic disc medium protective layer can be held to be small. It can thus be concluded that by setting the Young's modulus of the magnetic head protective layer to be higher than the Young's modulus of the magnetic disc medium protective layer, it is possible to extremely reduce the wears of both the magnetic disc medium protective layer and the magnetic head protective layer and provide a magnetic disc apparatus, which is less subject to wear and damages, excellently durable and highly reliable.

Tables 7 to 11 show the results of durability tests, i.e., wear heights of magnetic disc medium protective layers and magnetic head protective layers, obtained with magnetic disc apparatuses which were produced by setting the hardnesses of the magnetic disc medium protective layer and the magnetic head protective layer to be 40 (GPa) and in a range of 40 to 140 (GPa), respectively, with thicknesses of the magnetic disc medium protective layer in a range of 1 to 20 nm. The thickness of the magnetic head protective layer was set to be 10 nm.

With reference to the results of tests conducted on Examples No. 33 to 41 and Contrast Examples 37 to 63 in Tables 7 to 9, it will be seen that so long as the thickness of the magnetic disc medium protective layer is between 1 and 10 nm, the wear heights of the magnetic disc medium protective layer and the magnetic head protective layer can both be held to be small when the hardness of the magnetic head protective layer is between 1.5 and 2.0 times the hardness of the magnetic disc medium protective layer. It will also be seen that when the hardness of the magnetic head protective layer is not higher than 1.5 times the hardness of the magnetic disc medium protective layer, the wear height of the magnetic head protective layer is large. It will further be seen that when the hardness of the former is higher than 2.0 times the hardness of the latter, the wear heights of the magnetic disc medium protective layer and the magnetic head protective layer are both extremely large.

With reference to the results of tests conducted on Contrast Examples No. 64 to 87 in Tables 10 and 11, so long as the thickness of the magnetic disc medium protective layer is 15 nm or above, the wear heights of the magnetic disc medium protective layer and the magnetic head protective layer can both be held to be small when the hardness of the magnetic head protective layer is higher than 2.0 times the hardness of the magnetic disc medium protective layer. It will also be seen that when the hardness of the magnetic head protective layer is not higher than 2.0 times the hardness of the magnetic disc medium, the wear height of the magnetic head protective layer is extremely large although the wear height of the magnetic disc medium protective layer can be held to be small. It can thus be concluded that it is possible to extremely reduce the wears of the magnetic disc medium protective layer and the magnetic head protective layer and provide a magnetic disc apparatus, which is less subject to wear and damages, excellently durable and highly reliable, by setting the hardness of the magnetic heads protective layer to be between 1.5 and 2.0 times the hardness of the magnetic disc medium protective layer when the thickness of the magnetic disc medium protective layer is between 1 and 10 nm, and to be higher than 2.0 times the hardness of the magnetic disc medium protective layer when the magnetic disc medium protective layer is as thick as 15 nm.

Tables 7 to 11 show the results of tests conducted by setting constant magnetic head protective layer thickness of 10 nm. When the magnetic head protective layer thickness was varied in a range of 2 to 20 nm, the wears of the magnetic disc medium protective layer and the magnetic heads protective layer were hardly changed.

While in the above examples the magnetic head protective layer and the magnetic disc medium protective layer were formed as a carbon layer with or without a hydrogen or nitrogen content, the same results could be obtained by using SiC, SiN and BN.

The materials and the method of formation of the substrate, the base layer, the magnetic layer, the magnetic disc medium protective layer, the magnetic head protective layer, the lubricant layer, the magnetic head slider, the magnetic recording/reproducing element, the gimbal spring, the load beam spring, the supporting arm, and the contact pad in the above examples are by no means limitative, and it is possible to use well-known materials and methods of formation without any special limitation.

While in the above examples a lubricant was used for the magnetic disc medium protective layer, it is possible to obtain the same effects as those described in connection with the examples without any lubricant.

As has been described in the foregoing, according to the invention the following effects are obtainable.

By setting the Young's modulus or the density of the magnetic head protective layer to be higher than the Young's modulus or the density of the magnetic disc medium protective layer, or in the case where the magnetic disc medium protective layer has as small thickness as 1 to 10 nm by setting the hardness of the magnetic head protective layer to be between 1.5 to 2.0 times the magnetic disc medium protective layer, wear and damages due to the sliding are not caused partially on either the magnetic disc medium protective layer side or the magnetic head protective layer side, but they can proceed uniformly on both sides. It is thus possible to reduce the degree of wear and damages and provide a highly reliable magnetic disc apparatus, which is subject to less wear and damages and excellently reliable.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

TABLE 1

RELATIONSHIP BETWEEN DENSITIES OF MAGNETIC DISC MEDIUM PROTECTIVE LAYER AND MAGNETIC HEAD PROTECTIVE LAYER, AND WEAR HEIGHT

| NO. | DENSITY OF MAGNETIC DISC MEDIUM PROTECTIVE LAYER ($g/cm^3$) | DENSITY OF MAGNETIC HEAD PROTECTIVE LAYER ($g/cm^3$) | WEAR HEIGHT OF MAGNETIC DISC MEDIUM PROTECTIVE LAYER (nm) | WEAR HEIGHT OF MAGNETIC HEAD PROTECTIVE LAYER (nm) | THICKNESS OF DISC MAGNETIC MEDIUM PROTECTIVE LAYER (nm) | THICKNESS OF MAGNETIC HEAD PROTECTIVE LAYER (nm) |
|---|---|---|---|---|---|---|
| CONTRAST EXAMPLE 1 | 1.2 | 1.0 | 0.4 | 8.6 | 10 | 10 |
| CONTRAST EXAMPLE 2 | 1.2 | 1.1 | 0.6 | 7.4 | 10 | 10 |
| CONTRAST EXAMPLE 3 | 1.2 | 1.2 | 1.2 | 6.9 | 10 | 10 |
| EXAMPLE 1 | 1.2 | 1.3 | 1.4 | 1.8 | 10 | 10 |
| EXAMPLE 2 | 1.2 | 1.4 | 1.5 | 1.6 | 10 | 10 |
| EXAMPLE 3 | 1.2 | 1.5 | 1.4 | 1.7 | 10 | 10 |
| EXAMPLE 4 | 1.2 | 1.6 | 1.6 | 1.0 | 10 | 10 |
| EXAMPLE 5 | 1.2 | 1.7 | 1.8 | 1.2 | 10 | 10 |
| EXAMPLE 6 | 1.2 | 1.8 | 1.9 | 1.6 | 10 | 10 |
| EXAMPLE 7 | 1.2 | 1.9 | 1.8 | 1.0 | 10 | 10 |
| EXAMPLE 8 | 1.2 | 2.0 | 1.9 | 0.6 | 10 | 10 |

TABLE 2

RELATIONSHIP BETWEEN DENSITIES OF MAGNETIC DISC MEDIUM PROTECTIVE LAYER AND MAGNETIC HEAD PROTECTIVE LAYER, AND WEAR HEIGHT

| NO. | DENSITY OF MAGNETIC DISC MEDIUM PROTECTIVE LAYER ($g/cm^3$) | DENSITY OF MAGNETIC HEAD PROTECTIVE LAYER ($g/cm^3$) | WEAR HEIGHT OF MAGNETIC DISC MEDIUM PROTECTIVE LAYER (nm) | WEAR HEIGHT OF MAGNETIC HEAD PROTECTIVE LAYER (nm) | THICKNESS OF MAGNETIC DISC MEDIUM PROTECTIVE LAYER (nm) | THICKNESS OF MAGNETIC HEAD PROTECTIVE LAYER (nm) |
|---|---|---|---|---|---|---|
| CONTRAST EXAMPLE 4 | 1.4 | 1.0 | 0.3 | 8.7 | 10 | 10 |
| CONTRAST EXAMPLE 5 | 1.4 | 1.1 | 0.4 | 8.5 | 10 | 10 |
| CONTRAST EXAMPLE 6 | 1.4 | 1.2 | 0.5 | 7.5 | 10 | 10 |
| CONTRAST EXAMPLE 7 | 1.4 | 1.3 | 1.2 | 8.1 | 10 | 10 |
| CONTRAST EXAMPLE 8 | 1.4 | 1.4 | 1.5 | 6.2 | 10 | 10 |
| EXAMPLE 9 | 1.4 | 1.5 | 1.6 | 1.3 | 10 | 10 |
| EXAMPLE 10 | 1.4 | 1.6 | 1.4 | 1.2 | 10 | 10 |
| EXAMPLE 11 | 1.4 | 1.7 | 1.7 | 1.4 | 10 | 10 |
| EXAMPLE 12 | 1.4 | 1.8 | 1.6 | 1.6 | 10 | 10 |
| EXAMPLE 13 | 1.4 | 1.9 | 1.3 | 1.0 | 10 | 10 |
| EXAMPLE 14 | 1.4 | 2.0 | 1.9 | 0.8 | 10 | 10 |

TABLE 3

RELATIONSHIP BETWEEN DENSITIES OF MAGNETIC DISC MEDIUM PROTECTIVE LAYER AND MAGNETIC HEAD PROTECTIVE LAYER, AND WEAR HEIGHT

| NO. | DENSITY OF MAGNETIC DISC MEDIUM PROTECTIVE LAYER ($g/cm^3$) | DENSITY OF MAGNETIC HEAD PROTECTIVE LAYER ($g/cm^3$) | WEAR HEIGHT OF MAGNETIC DISC MEDIUM PROTECTIVE LAYER (nm) | WEAR HEIGHT OF MAGNETIC HEAD PROTECTIVE LAYER (nm) | THICKNESS OF MAGNETIC DISC MEDIUM PROTECTIVE LAYER (nm) | THICKNESS OF MAGNETIC HEAD PROTECTIVE LAYER (nm) |
|---|---|---|---|---|---|---|
| CONTRAST EXAMPLE 9 | 1.6 | 1.0 | 0.4 | 9.3 | 10 | 10 |
| CONTRAST EXAMPLE 10 | 1.6 | 1.1 | 0.5 | 9.1 | 10 | 10 |
| CONTRAST EXAMPLE 11 | 1.6 | 1.2 | 0.4 | 8.6 | 10 | 10 |
| CONTRAST EXAMPLE 12 | 1.6 | 1.3 | 0.9 | 8.9 | 10 | 10 |
| CONTRAST EXAMPLE 13 | 1.6 | 1.4 | 1.1 | 7.9 | 10 | 10 |
| CONTRAST EXAMPLE 14 | 1.6 | 1.5 | 1.3 | 8.1 | 10 | 10 |
| CONTRAST EXAMPLE 15 | 1.6 | 1.6 | 1.5 | 7.5 | 10 | 10 |
| EXAMPLE 15 | 1.6 | 1.7 | 1.8 | 1.6 | 10 | 10 |
| EXAMPLE 16 | 1.5 | 1.8 | 1.9 | 1.3 | 10 | 10 |
| EXAMPLE 17 | 1.6 | 1.9 | 1.6 | 1.2 | 10 | 10 |
| EXAMPLE 18 | 1.6 | 2.0 | 1.8 | 1.1 | 10 | 10 |

TABLE 4

RELATIONSHIP BETWEEN DENSITIES OF MAGNETIC DISC MEDIUM PROTECTIVE LAYER AND MAGNETIC HEAD PROTECTIVE LAYER, AND WEAR HEIGHT

| NO. | DENSITY OF MAGNETIC DISC MEDIUM PROTECTIVE LAYER (g/cm$^3$) | DENSITY OF MAGNETIC HEAD PROTECTIVE LAYER (g/cm$^3$) | WEAR HEIGHT OF MAGNETIC DISC MEDIUM PROTECTIVE LAYER (nm) | WEAR HEIGHT OF MAGNETIC HEAD PROTECTIVE LAYER (nm) | THICKNESS OF MAGNETIC DISC MEDIUM PROTECTIVE LAYER (nm) | THICKNESS OF MAGNETIC HEAD PROTECTIVE LAYER (nm) |
|---|---|---|---|---|---|---|
| CONTRAST EXAMPLE 16 | 1.8 | 1.0 | 0.6 | 9.3 | 10 | 10 |
| CONTRAST EXAMPLE 17 | 1.8 | 1.1 | 0.5 | 9.7 | 10 | 10 |
| CONTRAST EXAMPLE 18 | 1.8 | 1.2 | 0.8 | 9.4 | 10 | 10 |
| CONTRAST EXAMPLE 19 | 1.8 | 1.3 | 0.9 | 9.0 | 10 | 10 |
| CONTRAST EXAMPLE 20 | 1.8 | 1.4 | 0.8 | 8.9 | 10 | 10 |
| CONTRAST EXAMPLE 21 | 1.8 | 1.5 | 0.6 | 8.6 | 10 | 10 |
| CONTRAST EXAMPLE 22 | 1.8 | 1.6 | 1.1 | 7.9 | 10 | 10 |
| CONTRAST EXAMPLE 23 | 1.8 | 1.7 | 1.1 | 8.0 | 10 | 10 |
| CONTRAST EXAMPLE 24 | 1.8 | 1.8 | 1.6 | 8.3 | 10 | 10 |
| EXAMPLE 19 | 1.8 | 1.9 | 1.3 | 1.8 | 10 | 10 |
| EXAMPLE 20 | 1.8 | 2.0 | 1.7 | 1.5 | 10 | 10 |

TABLE 5

RELATIONSHIP BETWEEN YOUNG MODULES OF MAGNETIC DISC MEDIUM PROTECTIVE LAYER AND MAGNETIC HEAD PROTECTIVE LAYER, AND WEAR HEIGHT

| NO. | YOUNG MODULES OF MAGNETIC DISC MEDIUM PROTECTIVE LAYER (GPa) | YOUNG MODULES OF MAGNETIC HEAD PROTECTIVE LAYER (GPa) | WEAR HEIGHT OF MAGNETIC DISC MEDIUM PROTECTIVE LAYER (nm) | WEAR HEIGHT OF MAGNETIC HEAD PROTECTIVE LAYER (nm) | THICKNESS OF MAGNETIC DISC MEDIUM PROTECTIVE LAYER (nm) | THICKNESS OF MAGNETIC HEAD PROTECTIVE LAYER (nm) |
|---|---|---|---|---|---|---|
| CONTRAST EXAMPLE 25 | 200 | 150 | 0.4 | 8.6 | 10 | 10 |
| CONTRAST EXAMPLE 26 | 200 | 200 | 0.8 | 8.9 | 10 | 10 |
| EXAMPLE 21 | 200 | 250 | 1.2 | 1.6 | 10 | 10 |
| EXAMPLE 22 | 200 | 300 | 1.1 | 1.8 | 10 | 10 |
| EXAMPLE 23 | 200 | 350 | 1.0 | 1.1 | 10 | 10 |
| EXAMPLE 24 | 200 | 400 | 1.5 | 0.8 | 10 | 10 |
| EXAMPLE 25 | 200 | 450 | 1.6 | 0.9 | 10 | 10 |
| EXAMPLE 26 | 200 | 500 | 1.7 | 0.5 | 10 | 10 |

TABLE 6

RELATIONSHIP BETWEEN YOUNG MODULES OF MAGNETIC DISC MEDIUM PROTECTIVE LAYER AND MAGNETIC HEAD PROTECTIVE LAYER, AND WEAR HEIGHT

| NO. | YOUNG MODULES OF MAGNETIC DISC MEDIUM PROTECTIVE LAYER (GPa) | YOUNG MODULES OF MAGNETIC HEAD PROTECTIVE LAYER (GPa) | WEAR HEIGHT OF MAGNETIC DISC MEDIUM PROTECTIVE LAYER (nm) | WEAR HEIGHT OF MAGNETIC HEAD PROTECTIVE LAYER (nm) | THICKNESS OF MAGNETIC DISC MEDIUM PROTECTIVE LAYER (nm) | THICKNESS OF MAGNETIC HEAD PROTECTIVE LAYER (nm) |
|---|---|---|---|---|---|---|
| CONTRAST EXAMPLE 27 | 300 | 150 | 0.8 | 9.7 | 10 | 10 |

TABLE 6-continued

RELATIONSHIP BETWEEN YOUNG MODULES OF MAGNETIC DISC MEDIUM PROTECTIVE LAYER AND MAGNETIC HEAD PROTECTIVE LAYER, AND WEAR HEIGHT

| NO. | YOUNG MODULES OF MAGNETIC DISC MEDIUM PROTECTIVE LAYER (GPa) | YOUNG MODULES OF MAGNETIC HEAD PROTECTIVE LAYER (GPa) | WEAR HEIGHT OF MAGNETIC DISC MEDIUM PROTECTIVE LAYER (nm) | WEAR HEIGHT OF MAGNETIC HEAD PROTECTIVE LAYER (nm) | THICKNESS OF MAGNETIC DISC MEDIUM PROTECTIVE LAYER (nm) | THICKNESS OF MAGNETIC HEAD PROTECTIVE LAYER (nm) |
|---|---|---|---|---|---|---|
| CONTRAST EXAMPLE 28 | 300 | 200 | 1.1 | 8.6 | 10 | 10 |
| CONTRAST EXAMPLE 29 | 300 | 250 | 0.9 | 8.5 | 10 | 10 |
| CONTRAST EXAMPLE 30 | 300 | 300 | 1.5 | 7.8 | 10 | 10 |
| EXAMPLE 27 | 300 | 350 | 1.1 | 1.4 | 10 | 10 |
| EXAMPLE 28 | 300 | 400 | 1.5 | 1.0 | 10 | 10 |
| EXAMPLE 29 | 300 | 450 | 1.6 | 1.1 | 10 | 10 |
| EXAMPLE 30 | 300 | 500 | 1.4 | 0.8 | 10 | 10 |
| CONTRAST EXAMPLE 31 | 400 | 150 | 0.6 | 9.4 | 10 | 10 |
| CONTRAST EXAMPLE 32 | 400 | 200 | 0.6 | 9.8 | 10 | 10 |
| CONTRAST EXAMPLE 33 | 400 | 250 | 0.7 | 9.3 | 10 | 10 |
| CONTRAST EXAMPLE 34 | 400 | 300 | 0.8 | 9.6 | 10 | 10 |
| CONTRAST EXAMPLE 35 | 400 | 350 | 1.0 | 9.0 | 10 | 10 |
| CONTRAST EXAMPLE 36 | 400 | 400 | 1.5 | 8.4 | 10 | 10 |
| EXAMPLE 31 | 400 | 450 | 1.2 | 1.5 | 10 | 10 |
| EXAMPLE 32 | 400 | 500 | 1.5 | 1.0 | 10 | 10 |

TABLE 7

RELATIONSHIP BETWEEN HARDNESS OF MAGNETIC DISC MEDIUM PROTECTIVE LAYER AND MAGNETIC HEAD PROTECTIVE LAYER, AND WEAR HEIGHT

| NO. | HARDNESS OF MAGNETIC DISC MEDIUM PROTECTIVE LAYER (GPa) | HARDNESS OF MAGNETIC HEAD PROTECTIVE LAYER (GPa) | WEAR HEIGHT OF MAGNETIC DISC MEDIUM PROTECTIVE LAYER (nm) | WEAR HEIGHT OF MAGNETIC HEAD PROTECTIVE LAYER (nm) | THICKNESS OF MAGNETIC DISC MEDIUM PROTECTIVE LAYER (nm) | THICKNESS OF MAGNETIC HEAD PROTECTIVE LAYER (nm) |
|---|---|---|---|---|---|---|
| CONTRAST EXAMPLE 37 | 40 | 40 | 0.4 | 8.6 | 1 | 10 |
| CONTRAST EXAMPLE 38 | 40 | 50 | 0.4 | 8.1 | 1 | 10 |
| EXAMPLE 33 | 40 | 60 | 0.3 | 1.1 | 1 | 10 |
| EXAMPLE 34 | 40 | 70 | 0.1 | 1.0 | 1 | 10 |
| EXAMPLE 35 | 40 | 75 | 0.3 | 1.2 | 1 | 10 |
| CONTRAST EXAMPLE 39 | 40 | 80 | 1.0 | 9.1 | 1 | 10 |
| CONTRAST EXAMPLE 40 | 40 | 90 | 1.0 | 9.2 | 1 | 10 |
| CONTRAST EXAMPLE 41 | 40 | 100 | 1.0 | 9.8 | 1 | 10 |
| CONTRAST EXAMPLE 42 | 40 | 110 | 1.0 | 9.6 | 1 | 10 |
| CONTRAST EXAMPLE 43 | 40 | 120 | 1.0 | 9.0 | 1 | 10 |
| CONTRAST EXAMPLE 44 | 40 | 130 | 1.0 | 8.8 | 1 | 10 |
| CONTRAST EXAMPLE 45 | 40 | 140 | 1.0 | 8.7 | 1 | 10 |

TABLE 8

RELATIONSHIP BETWEEN HARDNESS OF MAGNETIC DISC MEDIUM PROTECTIVE LAYER AND MAGNETIC HEAD PROTECTIVE LAYER, AND WEAR HEIGHT

| NO. | HARDNESS OF MAGNETIC DISC MEDIUM PROTECTIVE LAYER (GPa) | HARDNESS OF MAGNETIC HEAD PROTECTIVE LAYER (GPa) | WEAR HEIGHT OF MAGNETIC DISC MEDIUM PROTECTIVE LAYER (nm) | WEAR HEIGHT OF MAGNETIC HEAD PROTECTIVE LAYER (nm) | THICKNESS OF MAGNETIC DISC MEDIUM PROTECTIVE LAYER (nm) | THICKNESS OF MAGNETIC HEAD PROTECTIVE LAYER (nm) |
|---|---|---|---|---|---|---|
| CONTRAST EXAMPLE 46 | 40 | 40 | 0.2 | 9.1 | 5 | 10 |
| CONTRAST EXAMPLE 47 | 40 | 50 | 0.3 | 8.2 | 5 | 10 |
| EXAMPLE 36 | 40 | 60 | 0.1 | 1.4 | 5 | 10 |
| EXAMPLE 37 | 40 | 70 | 0.1 | 1.2 | 5 | 10 |
| EXAMPLE 38 | 40 | 75 | 0.2 | 1.6 | 5 | 10 |
| CONTRAST EXAMPLE 48 | 40 | 80 | 5.0 | 4.6 | 5 | 10 |
| CONTRAST EXAMPLE 49 | 40 | 90 | 5.0 | 8.4 | 5 | 10 |
| CONTRAST EXAMPLE 50 | 40 | 100 | 5.0 | 7.9 | 5 | 10 |
| CONTRAST EXAMPLE 51 | 40 | 110 | 5.0 | 9.1 | 5 | 10 |
| CONTRAST EXAMPLE 52 | 40 | 120 | 5.0 | 9.2 | 5 | 10 |
| CONTRAST EXAMPLE 53 | 40 | 130 | 5.0 | 9.4 | 5 | 10 |
| CONTRAST EXAMPLE 54 | 40 | 140 | 5.0 | 8.5 | 5 | 10 |

TABLE 9

RELATIONSHIP BETWEEN HARDNESS OF MAGNETIC DISC MEDIUM PROTECTIVE LAYER AND MAGNETIC HEAD PROTECTIVE LAYER, AND WEAR HEIGHT

| NO. | HARDNESS OF MAGNETIC DISC MEDIUM PROTECTIVE LAYER (GPa) | HARDNESS OF MAGNETIC HEAD PROTECTIVE LAYER (GPa) | WEAR HEIGHT OF MAGNETIC DISC MEDIUM PROTECTIVE LAYER (nm) | WEAR HEIGHT OF MAGNETIC HEAD PROTECTIVE LAYER (nm) | THICKNESS OF MAGNETIC DISC MEDIUM PROTECTIVE LAYER (nm) | THICKNESS OF MAGNETIC HEAD PROTECTIVE LAYER (nm) |
|---|---|---|---|---|---|---|
| CONTRAST EXAMPLE 55 | 40 | 40 | 0.1 | 9.3 | 10 | 10 |
| CONTRAST EXAMPLE 56 | 40 | 50 | 0.2 | 9.4 | 10 | 10 |
| EXAMPLE 39 | 40 | 60 | 0.1 | 1.0 | 10 | 10 |
| EXAMPLE 40 | 40 | 70 | 0.2 | 1.3 | 10 | 10 |
| EXAMPLE 41 | 40 | 75 | 0.1 | 1.2 | 10 | 10 |
| CONTRAST EXAMPLE 57 | 40 | 80 | 10.0 | 7.6 | 10 | 10 |
| CONTRAST EXAMPLE 58 | 40 | 90 | 10.0 | 8.5 | 10 | 10 |
| CONTRAST EXAMPLE 59 | 40 | 100 | 10.0 | 8.6 | 10 | 10 |
| CONTRAST EXAMPLE 60 | 40 | 110 | 10.0 | 9.6 | 10 | 10 |
| CONTRAST EXAMPLE 61 | 40 | 120 | 10.0 | 8.9 | 10 | 10 |
| CONTRAST EXAMPLE 62 | 40 | 130 | 10.0 | 9.3 | 10 | 10 |
| CONTRAST EXAMPLE 63 | 40 | 140 | 10.0 | 9.1 | 10 | 10 |

TABLE 10

RELATIONSHIP BETWEEN HARDNESS OF MAGNETIC DISC MEDIUM PROTECTIVE LAYER AND MAGNETIC HEAD PROTECTIVE LAYER, AND WEAR HEIGHT

| NO. | HARDNESS OF MAGNETIC DISC MEDIUM PROTECTIVE LAYER (GPa) | HARDNESS OF MAGNETIC HEAD PROTECTIVE LAYER (GPa) | WEAR HEIGHT OF MAGNETIC DISC MEDIUM PROTECTIVE LAYER (nm) | WEAR HEIGHT OF MAGNETIC HEAD PROTECTIVE LAYER (nm) | THICKNESS OF MAGNETIC DISC MEDIUM PROTECTIVE LAYER (nm) | THICKNESS OF MAGNETIC HEAD PROTECTIVE LAYER (nm) |
|---|---|---|---|---|---|---|
| CONTRAST EXAMPLE 64 | 40 | 40 | 0.2 | 8.6 | 15 | 10 |
| CONTRAST EXAMPLE 65 | 40 | 50 | 0.3 | 9.2 | 15 | 10 |
| CONTRAST EXAMPLE 66 | 40 | 60 | 0.1 | 5.6 | 15 | 10 |
| CONTRAST EXAMPLE 67 | 40 | 70 | 0.2 | 4.2 | 15 | 10 |
| CONTRAST EXAMPLE 68 | 40 | 75 | 0.1 | 2.3 | 15 | 10 |
| CONTRAST EXAMPLE 69 | 40 | 80 | 1.3 | 1.0 | 15 | 10 |
| CONTRAST EXAMPLE 70 | 40 | 90 | 1.9 | 1.3 | 15 | 10 |
| CONTRAST EXAMPLE 71 | 40 | 100 | 1.5 | 1.3 | 15 | 10 |
| CONTRAST EXAMPLE 72 | 40 | 110 | 1.3 | 1.2 | 15 | 10 |
| CONTRAST EXAMPLE 73 | 40 | 120 | 0.2 | 0.2 | 15 | 10 |
| CONTRAST EXAMPLE 74 | 40 | 130 | 0.1 | 0.2 | 15 | 10 |
| CONTRAST EXAMPLE 75 | 40 | 140 | 0.2 | 0.1 | 15 | 10 |

TABLE 11

RELATIONSHIP BETWEEN HARDNESS OF MAGNETIC DISC MEDIUM PROTECTIVE LAYER AND MAGNETIC HEAD PROTECTIVE LAYER, AND WEAR HEIGHT

| NO. | HARDNESS OF MAGNETIC DISC MEDIUM PROTECTIVE LAYER (GPa) | HARDNESS OF MAGNETIC HEAD PROTECTIVE LAYER (GPa) | WEAR HEIGHT OF MAGNETIC DISC MEDIUM PROTECTIVE LAYER (nm) | WEAR HEIGHT OF MAGNETIC HEAD PROTECTIVE LAYER (nm) | THICKNESS OF MAGNETIC DISC MEDIUM PROTECTIVE LAYER (nm) | THICKNESS OF MAGNETIC HEAD PROTECTIVE LAYER (nm) |
|---|---|---|---|---|---|---|
| CONTRAST EXAMPLE 76 | 40 | 40 | 0.1 | 9.2 | 20 | 10 |
| CONTRAST EXAMPLE 77 | 40 | 50 | 0.2 | 8.2 | 20 | 10 |
| CONTRAST EXAMPLE 78 | 40 | 60 | 0.3 | 5.3 | 20 | 10 |
| CONTRAST EXAMPLE 79 | 40 | 70 | 0.3 | 4.3 | 20 | 10 |
| CONTRAST EXAMPLE 80 | 40 | 75 | 1.3 | 5.3 | 20 | 10 |
| CONTRAST EXAMPLE 81 | 40 | 80 | 1.0 | 1.2 | 20 | 10 |
| CONTRAST EXAMPLE 82 | 40 | 90 | 1.2 | 1.3 | 20 | 10 |
| CONTRAST EXAMPLE 83 | 40 | 100 | 1.3 | 1.1 | 20 | 10 |
| CONTRAST EXAMPLE 84 | 40 | 110 | 1.3 | 1.0 | 20 | 10 |
| CONTRAST EXAMPLE 85 | 40 | 120 | 0.2 | 0.2 | 20 | 10 |
| CONTRAST EXAMPLE 86 | 40 | 130 | 0.1 | 0.2 | 20 | 10 |
| CONTRAST EXAMPLE 87 | 40 | 140 | 0.1 | 0.1 | 20 | 10 |

What is claimed is:

1. A magnetic disc apparatus comprising a magnetic disc medium having a protective layer of thickness between 1 and 10 nm on the surface, a means for rotating the magnetic disc medium, a magnetic head for recording and reproducing data on and from the magnetic disc medium, and a control means for controlling the magnetic disc medium, the rotating means and the head, wherein the head has a protective layer formed on at least part of a portion to be in frictional contact with the magnetic disc medium, the magnetic head protective layer of a hardness between 1.5 and 2.0 times the hardness of the magnetic disc medium protective layer.

2. The magnetic disc apparatus according to claim 1, wherein the magnetic head protective layer and the magnetic disc medium protective layer are made of the same material.

3. The magnetic disc apparatus according to claim 1, wherein the magnetic head protective layer and the magnetic disc medium protective layer are made of material including mainly carbon.

4. A magnetic disc apparatus comprising a magnetic disc medium having a protective layer on its surface, and a magnetic head for recording and reproducing data on and from the magnetic disc medium having a protective layer on its surface, the magnetic disc medium and the magnetic head being rotated in frictional contact therebetween, wherein the magnetic head protective layer has a Young's modulus higher than the Young's modulus of the magnetic disc medium protective layer, wherein the Young's moduluses of the magnetic disc medium protective layer and the magnetic head protective layer are set to be in range of 200 to 400 (GPa) and 250 to 500 (GPa), respectively.

5. The magnetic disc apparatus according to claim 4, wherein the magnetic head protective layer and the magnetic disc medium protective layer are formed as a carbon layer with or without a hydrogen or nitrogen content.

6. The magnetic disc apparatus according to claim 4, wherein the magnetic head protective layer and the magnetic disc medium protective layer are formed as SiC, SiN or BN.

7. A magnetic disc apparatus comprising:

a magnetic disc medium having a protective layer on its surface; and a magnetic head also having a protective layer on its surface, said magnetic head for recording and reproducing data on and from the magnetic disc medium, the magnetic disc medium and the magnetic head being rotated in frictional contact therebetween, wherein a thickness of the magnetic disc medium protective layer is set to be between 1 and 10 nm, and a hardness of the magnetic bead protective layer is set to be between 1.5 and 2.0 times a hardness of the magnetic disc medium protective layer.

8. The magnetic disc apparatus according to claim 7, wherein the magnetic head protective layer and the magnetic disc medium protective layer are formed as a carbon layer with or without a hydrogen or nitrogen content.

9. The magnetic disc apparatus according to claim 7, wherein the magnetic head protective layer and the magnetic disc medium protective layer are formed as SiC, SiN or BN.

* * * * *